United States Patent [19]

Watanabe

[11] Patent Number: 4,947,423
[45] Date of Patent: Aug. 7, 1990

[54] COMMUNICATION APPARATUS WITH FACILITIES FOR CHANGING TO A PULSE OR DIAL MODE

[75] Inventor: Tsunehiro Watanabe, Tokyo, Japan

[73] Assignee: Canon Kabushiki Kaisha, Tokyo, Japan

[21] Appl. No.: 291,777

[22] Filed: Dec. 29, 1988

[30] Foreign Application Priority Data

Jan. 11, 1988 [JP] Japan ................................. 63-4311

[51] Int. Cl.⁵ .................... H04M 1/31; H04M 1/50
[52] U.S. Cl. .............................................. 379/353
[58] Field of Search ................... 379/353, 361, 362

[56] References Cited

U.S. PATENT DOCUMENTS

| | | | |
|---|---|---|---|
| 4,232,200 | 11/1980 | Hestad et al. | 379/353 |
| 4,825,461 | 4/1989 | Kurita et al. | 379/93 |
| 4,833,705 | 5/1989 | Kobayashi | 379/93 |

Primary Examiner—Stafford D. Schreyer
Attorney, Agent, or Firm—Fitzpatrick, Cella, Harper & Scinto

[57] ABSTRACT

A communication apparatus includes a pulse dial signal generator, a tone dial signal generator, a switching circuit including a self-return switch and a self-non-return switch, for switching the pulse dial generator and the tone dial generator, a plurality of input keys such as a ten-key pad for inputting data, and a dialer circuit for switching at least one of the input keys in synchronism with an operation of the switching circuit.

7 Claims, 6 Drawing Sheets

COMMUNICATION APPARATUS WITH FACILITIES FOR CHANGING TO A PULSE OR DIAL MODE

BACKGROUND OF THE INVENTION:

1. Field of the Invention

The present invention relates to a communication apparatus having a pulse dial function and a tone dial function.

2. Related Background Art

A telephone set having a pulse dial function (to be referred to as DP (Dial Pulse) function hereinafter) and a tone dial function (to be referred to as PB (Push Button) function hereinafter) is known. When an outgoing call is made in the DP function and at the same time a function for outputting a tone dial signal is effected (simultaneous use of these two functions is called "mixed dialing" hereinafter), a DP/PB selection switch is set at the DP position and an outgoing call is made; and the DP/PB switch is then switched to the PB position and a dial switch is depressed. Alternatively, the DP/PB switch is set in the DP position and the outgoing call is made; and a separate selection bottom is depressed to set the PB mode and the dial switch is depressed.

However, according to the above methods, the separate button need not be used by a PB subscriber. In the method of switching between the DP and PB positions, if a user forgets to reset the DP/PB selection switch to the DP position, a PB signal is directly output at the time of the next call.

SUMMARY OF THE INVENTION

It is an object of the present invention to solve the conventional problems described above and to improve a communication apparatus.

It is another object of the present invention to switch a function of a separate operating means in synchronism with a means for switching between the PB and DP functions.

It is still another object of the present invention to provide a self-return switching means and a self-non-return switching means as means for switching between the PB and DP functions.

The above and other objects, features, and advantages of the present invention will be apparent from the following detailed description of a preferred embodiment in conjunction with the accompanying drawings.

DETAILED DESCRIPTION OF THE PREFERRED EMBODIMENT

A preferred embodiment of the present invention will be described in detail with reference to the accompanying drawings. This embodiment exemplifies a telephone set.

Figure 1:
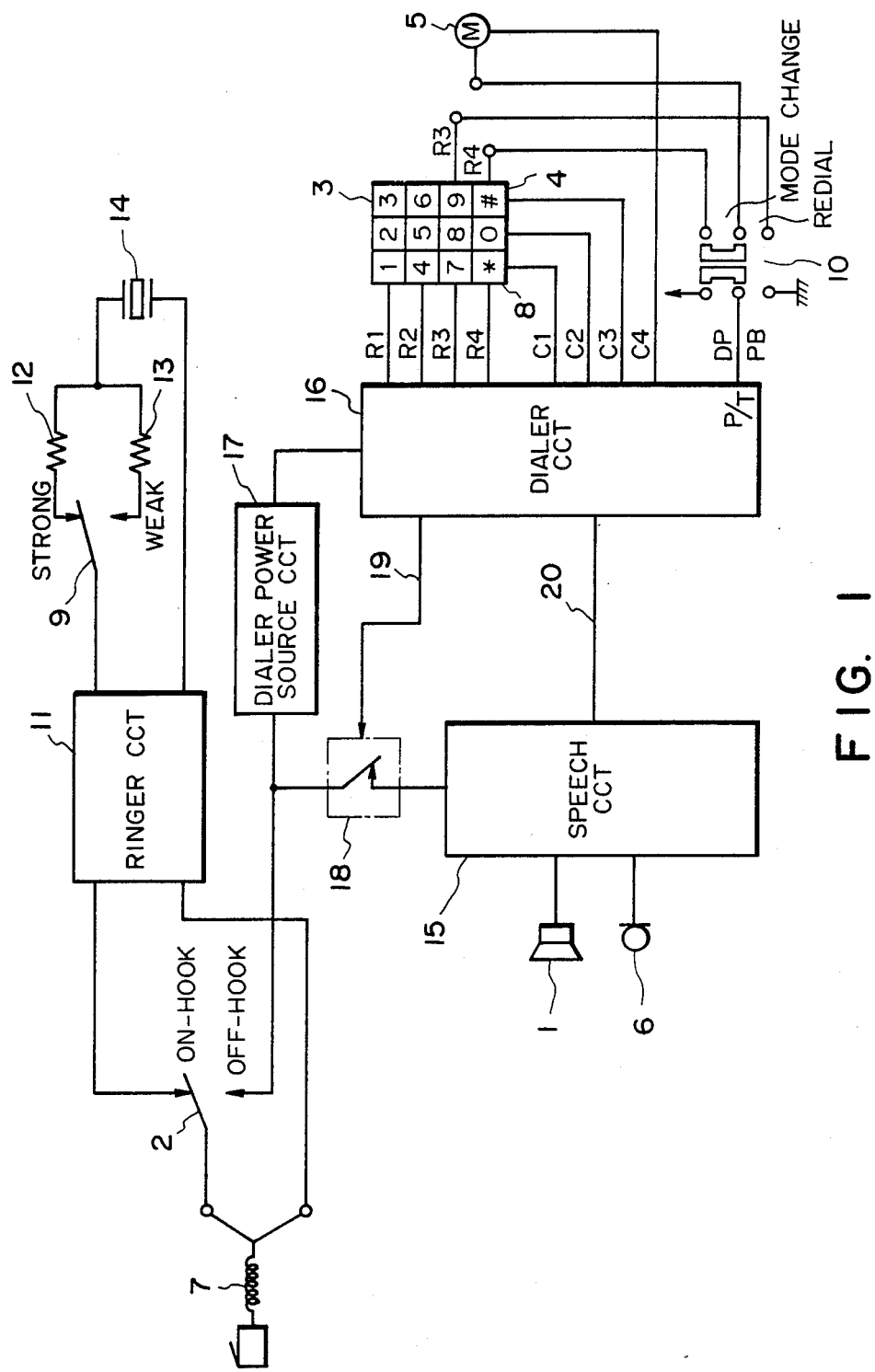
FIG. 1 is a block diagram showing a telephone set according to an embodiment of the present invention.

FIG. 1 is a block diagram showing an arrangement of a telephone set according to this embodiment.

Referring to FIG. 1, the telephone set includes a a telephone receiver 1 for reproducing voice from the other end of the line, a hook switch 2 for controlling connection/disconnection of the telephone set to/from a telephone line, numeric keys 3 corresponding to dial numbers, a ⃝# key 4 which generates a ⃝# tone in the PB mode but serves as a redial key in the DP mode, an ⓂM key 5 which serves as a redial key in the PB mode but serves as a mode change key from the DP mode to the PB mode in the DP position, a telephone transmitter 6, a curled cord 7 (telephone line), an ⃝* key 8 which generates an ⃝* tone in the PB mode but serves as a pause key in the DP mode, a ringing tone volume control switch 9, and a two-circuit built-in selection switch 10 for switching between the DP and PB modes and at the same time switching (function switching) a destination of the ⓂM key 5. The telephone set also includes a ringer circuit 11 for generating a ringing tone in response to a ringing signal from the telephone line, ringing tone volume control resistors 12 and 13, a tone generating element 14 for generating a ringing tone, a speech circuit 15 for electrically interfacing with the telephone line, a dialer circuit 16 for detecting a depressed key and outputting a selection signal, a dialer power source circuit 17 for applying a telephone line voltage to the dialer circuit 16, a switching element 18 for connecting the speech circuit 15 to the telephone line or disconnecting the speech circuit 15 from the telephone line, signal lines 19 for controlling an ON/OFF operation of the switching element 18, and a signal line 20 for sending a DTMF signal in the PB mode.

The dialer circuit 16 comprises: a microcomputer; microcomputer peripheral devices such as a read-only memory (ROM) for storing control programs of the microcomputer, a random access memory (RAM) for temporarily storing various data such as dial data, and an I/O port; and a DTMF signal generator for generating a tone signal such as a dial tone signal.

Figures 2, 3:
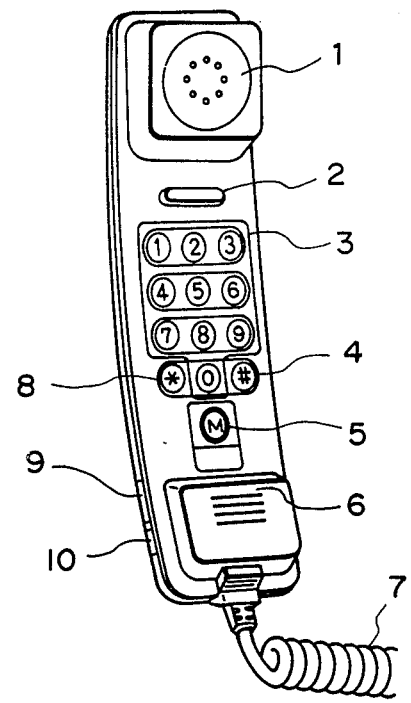
FIG. 2 is a perspective view of a handset for the telephone set shown in FIG. 1.
FIG. 3 is a schematic view showing key layout of the handset.
Figure 4A:
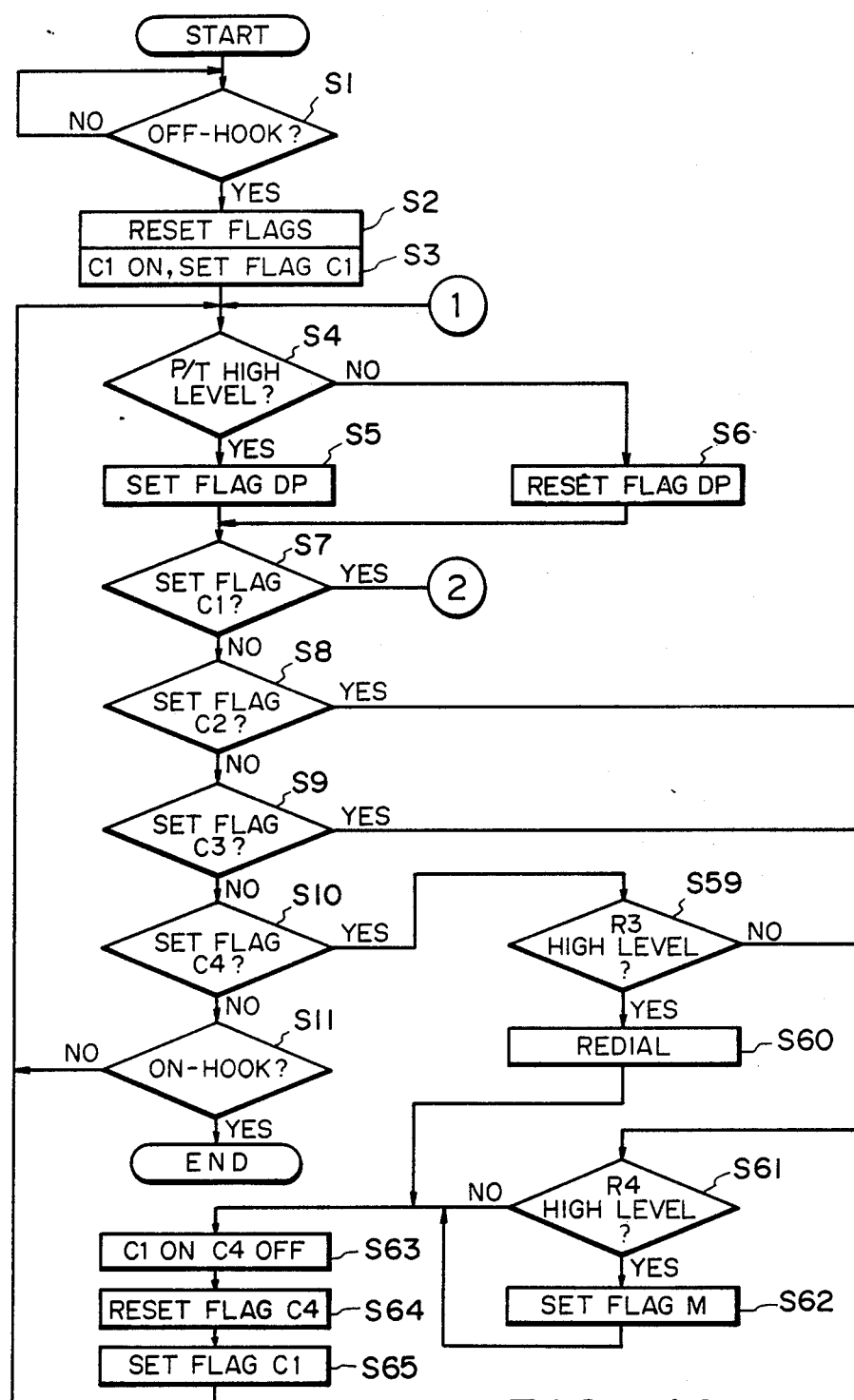
FIGS. 4A to 4D configured as shown in FIG. 4 are flow charts for explaining a control operation of a dialer circuit 16 shown in FIG. 1.
Figure 4B:
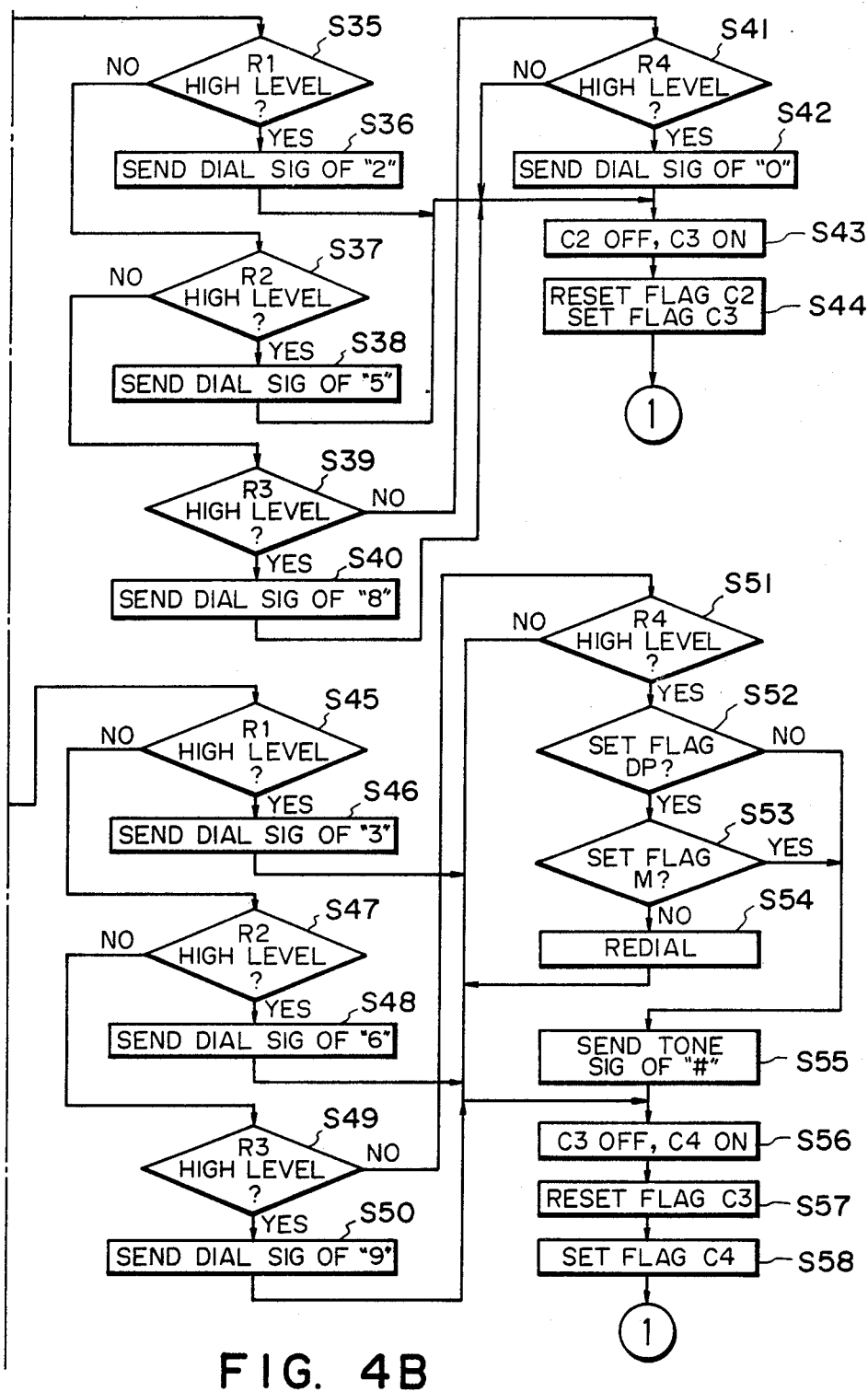
Figure 4C:
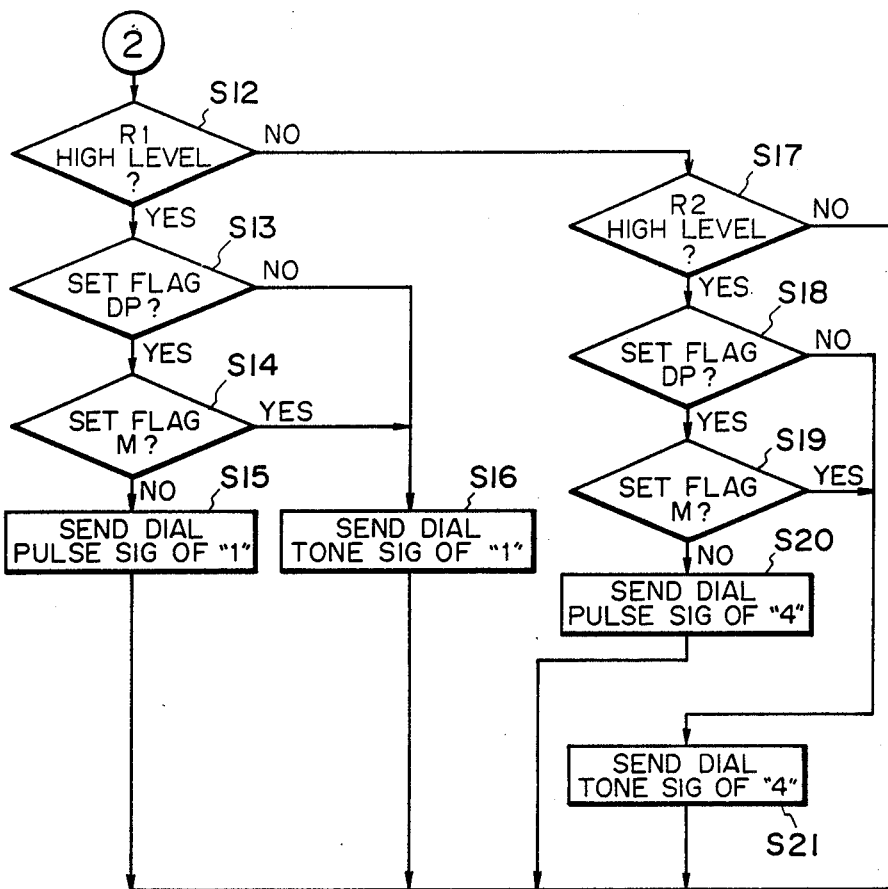
Figure 4:
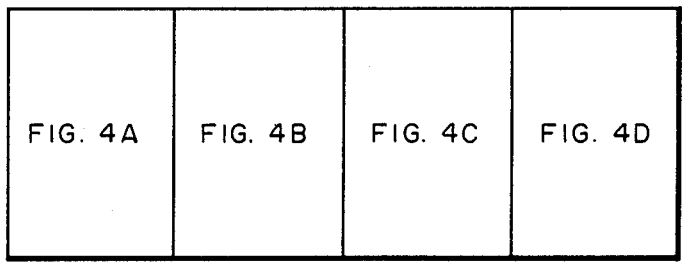
Figure 4D:
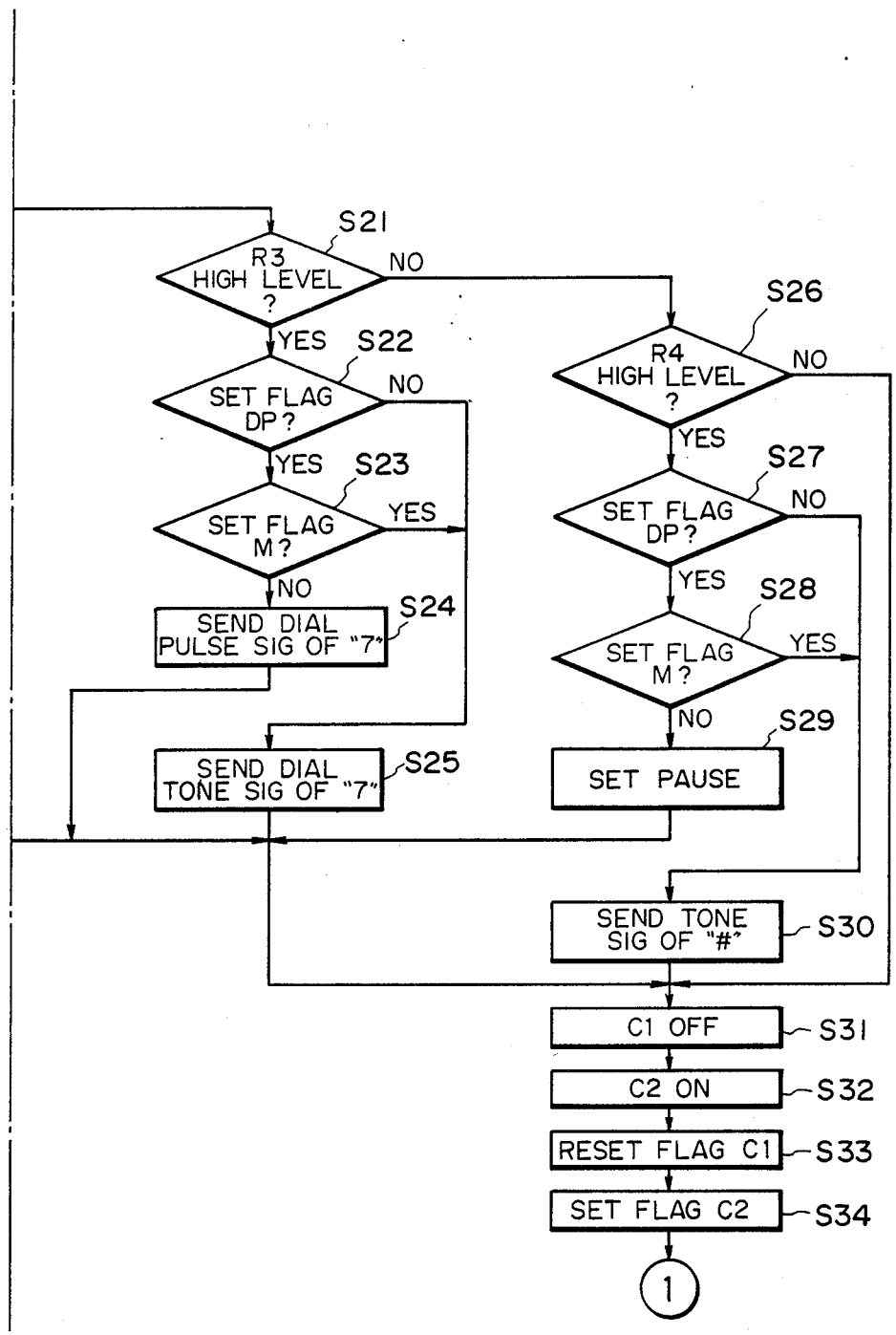

FIG. 2 is a perspective view of a handset of this embodiment.

FIG. 3 is a schematic view showing key layout of this embodiment.

When the telephone set having the above arrangement according to this embodiment is installed, the switch 10 is set at the PB or DP position.

When the switch 10 is set at the DP position and a user takes up the handset so as to make a call, the hook switch 2 is connected to the off-hook side, and a voltage from the telephone line is applied to the dialer circuit 16 through the power source circuit 17. The dialer circuit 16 enables the switching element 18 through the signal line 19, thereby connecting the telephone line to the speech circuit 15. When a telephone number is input with the numeric keys 3, the switching element 18 is turned off through the corresponding signal line 19, and a DP selection signal is output. When the ⃝# key is depressed in the off-hook state, the telephone number of the immediately preceding call is output from the dialer circuit 16 (redialing). In this state, when the ⓂM key 5 is depressed, the mode of the dial signal connected to the mode change side is changed from the DP mode to the PB mode by the switch 10. Thereafter, when the numeric keys 3, the ⃝# key 4, and the ⃝* key 8 are depressed, signals corresponding to these keys are output to the telephone line through the signal line 20 and the speech circuit 15. At the end of communication, when the telephone set is set in the on-hook state and then in the off-hook state again, the dial mode is automatically set to the DP mode since the switch 10 is set to the DP side.

When the switch 10 is set at the PB position, the operations from an off-hook operation to the engagement of the telephone line are the same as in the DP mode. In this state, when the Ⓜ key 5 is depressed, the telephone number of the immediately preceding call is accessed from the dialer circuit 16 by the switch 10 since the switch 10 is connected to the redial side. When the numeric keys 3, the ⍟ key 4, and the ⊛ key 8 are depressed, signals corresponding to these keys are output from the dialer circuit 16.

A control operation of the dialer circuit 16 in this embodiment will be described below.

FIGS. 4A to 4D are flow charts showing a control operation of the dialer circuit 16 of this embodiment. Control programs for executing control shown in the flow charts of FIGS. 4A to 4D are stored in the ROM 20 in the dialer circuit 16.

The dialer circuit 16 determines in step S1 whether the hook switch 2 is set in the off-hook state. If YES in step S1, the various flags are reset and lines C1 to C4 are disabled in step S2.

In step S3, the line C1 is enabled, and a flag C1 is set.

The dialer circuit 16 determines in step S4 whether an input P/T is set at high level. If YES in step S4, a flag DP is set to select a DP mode. However, if NO in step S4, a flag DP is reset to select a PB mode. Various key inputs are performed in steps S7 to S10.

When the dialer circuit 16 determines in step S7 that the flag C1 is set, the flow advances from step S7 to step S12 to check if an input R1 is set at high level. If YES in step S12, the dialer circuit 16 determines in steps S13 and 14 whether the flag DP is set and a flag M (i.e., a flag representing that the mode is changed to the PB mode in the DP mode) is set. If YES in step S13 and NO in step S14, the switching element 18 is operated to send a dial pulse signal of "1" in step S15. Otherwise, a tone dial signal of "1" is output in step S16. The flow then advances to step S31. At this time, dial data "1" of the dial signal (pulse dial or tone dial signal) of "1" is stored in a dial buffer arranged in the dialer circuit 16.

If it is determined in step S12 that the input R1 is not set at high level, the flow advances to step S17. The dialer circuit 16 determines in step S17 whether an input R2 is set at high level. If YES in step S17, the states of the flags DP and M are checked in steps S18 and 19 in the same manner as in steps S13 and S14. If the dialer circuit 16 determines that the flag DP is set and the flag M is not set, a pulse dial signal of "4" is output in step S20. Otherwise, a tone dial signal of "4" is output, and the flow advances to step S31.

If the dialer circuit 16 determines in step S17 that the input R2 is not set at high level, the flow advances to step S21 to check if an input R3 is set at high level. If YES in step S21, the dialer circuit 16 determines in steps S22 and S23 whether the flag DP is set and the flag M is set in the same manner as in steps S13 and S14. If the dialer circuit 16 determines that the flag DP is set and the flag M is not set, a pulse dial signal of "7" is output in step S24. Otherwise, a tone dial signal of "7" is output in step S25, and the flow advances to step S31.

If the dialer circuit 16 determines in step S21 that the input R3 is not set at high level, the flow advances to step S26 to check if an input R4 is set at high level. If YES in step S26, the dialer circuit 16 determines in steps S27 and S28 whether the flag DP is set and the flag M is set in the same manner as in steps S13 and S14. If the dialer circuit 16 determines that the flag DP is set and the flag M is not set, a pause (e.g., one-second pause) is set in step S29. At this time, pause data is stored in the dial buffer. Otherwise, a tone signal of "*" is output in step S30, and the flow advances to step S31. In step S31, the output C1 is disabled. An output C2 is enabled in step S32. The flag C1 is reset in step S33, and a flag C2 is set. The flow then returns to step S4.

In steps S7 and S12 to S34, the "1", "4", "7", and "*" key inputs are discriminated. When the "*" key 8 is depressed in the DP mode, this key input serves as a pause key input. However, when the "*" key 8 is depressed in the PB mode, a tone signal of the "*" key is output.

In steps S8 and S35 to S44, the "2", "5", "8", and "0" key inputs are discriminated in the same manner as in the "1", "4", and "7" key inputs. When inputs of the respective keys are detected, the pulse dial signal or the tone dial signal is output in accordance with the determination results of the flags DP and M. In step S43, the output C2 is disabled, and an output C3 is set. In step S44, the flag C2 is reset, and the flag C3 is set. The flow then returns to step S4.

In steps S9 and S45 to S58, "3", "6", "9", and "#" key inputs are discriminated in the same manner as in "1", "4", and "7" key inputs. "3", "6", and "9" key inputs are discriminated in steps S45 to S50. When these key inputs are detected, the pulse dial signal or the tone signal is output in accordance with the determination result of the flags DP and M. When the dialer circuit 16 determines in step S51 that the input R4 is set at high level, the dialer circuit 16 determines in steps S52 and S53 whether the flag DP is set and the flag M is set in the same manner as in steps S13 and S14. If the dialer circuit 16 determines that the flag DP is set and the flag M is not set, the switching element 18 is operated in step S54 in accordance with the dial data stored in the dial buffer, thereby performing redialing in the DP mode. Otherwise, a tone signal of the "#" key is output in step S55. In step S56, the output C3 is disabled, and an output C4 is enabled. In step S57, the flag C3 is reset. In step S58, a flag C4 is set. The flow then returns to step S4.

In steps S51 to S55, the "#" key serves as a redial key in the DP mode and as a "#" tone signal send key in the PB mode.

When the dialer circuit 16 determines in step S10 that the flag C4 is set, the dialer circuit 16 determines in step S59 whether the input R3 is set at high level. If YES in step S59, redialing is performed in step S60 by using the dial data stored in the dial buffer in the PB mode. However, if NO in step S59, the dialer circuit 16 determines in step S61 whether an input R4 is set at high level. If YES in step S61, the flag M is set in step S62 if the flag M is not set. However, if the flag M is set, the flag M is reset. An output C4 is disabled and the output C1 is enabled in step S63. In step S64, a flag C4 is reset. In step S65, the flag C1 is set. The flow returns to step S4.

In steps S59 to S65, the M key 5 serves as a mode change key in the DP mode and as a redial key in the PB mode. The flag M is automatically reset in the off-hook state. For this reason, if the PB mode is set by the M key 5 in the DP mode, the DP mode can be automatically restored in the next off-hook state.

When the dialer circuit 16 determines in step S11 that an on-hook state is set, the flow is ended. Otherwise, the flow returns to step S4.

The operation and arrangement of the speech circuit 15 are well known, and a detailed description thereof will be omitted.

The present invention is not limited to the telephone set, but is applicable to communication apparatuses such as a facsimile machine, a personal computer, and a teletex machine.

As described above, by using the means for switching between the DP and PB functions, functions of other operation buttons can be changed. Therefore, the number of operation buttons can be reduced, and the arrangement of the communication apparatus can be simplified.

Since the self-return switch and the self-non-return switch are arranged in the switching means, operations in mixed dialing can be simplified.

The present invention is not limited to the above embodiment. Various changes and modifications may be made within the spirit and scope of the invention.

What is claimed is:

1. A communication apparatus comprising:
   dialing means having a first mode for dialing a pulse dial signal and a second mode for sending a tone dial signal;
   switching means for changing over a mode of said dialing means between said first and second modes;
   key input means; and
   control means for temporarily changing over the first mode to the second mode in response to a key input by said key input means when the first mode is selected, and for conducting a control different from mode changeover in response to a key input by said key input means when the second mode is selected.

2. An apparatus according to claim 1, wherein said control means discriminates a condition of said switching means and conducts a control in response to a key input by said key input means in accordance with the discriminated condition.

3. An apparatus according to claim 1, wherein the temporary mode changeover in response to the key input means is released in response to an on-hook condition of a line of said communication apparatus.

4. An apparatus according to claim 1, wherein said control means performs redialing control in response to a key input in the second mode.

5. An apparatus according to claim 1, wherein a key input is changed in linkage connection with said switching means.

6. A communication apparatus comprising:
   dialing means having a first mode for sending a pulse dial signal and a second mode for sending a tone dial signal;
   switching means for changing over a mode of said dialing means between said first and second modes;
   key input means for temporarily changing over the first mode to the second mode in response when the first mode is selected;
   detecting means for detecting an off-hook condition of a line of said communication apparatus; and
   control means for temporarily changing over the first mode to the second mode in response to a key input by said key input means when both the first mode is selected and the off-hook condition of the line is detected, wherein the temporary changing-over in response to said key input means is released in response to an on-hook condition of said line.

7. An apparatus according to claim 6, wherein said control means discriminates a condition of said switching means and conducts a control in response to a key input by said key input means in accordance with the discriminated condition.

* * * * *

UNITED STATES PATENT AND TRADEMARK OFFICE
CERTIFICATE OF CORRECTION

PATENT NO. : 4,947,423
DATED : August 7, 1990
INVENTOR(S) : TSUNEHIRO WATANABE

It is certified that error appears in the above-identified patent and that said Letters Patent is hereby corrected as shown below:

COLUMN 2

Line 4, "receiver I" should read --receiver 1--.

Signed and Sealed this

Thirty-first Day of March, 1992

Attest:

HARRY F. MANBECK, JR.

Attesting Officer       Commissioner of Patents and Trademarks